United States Patent
Rehkemper et al.

[11] Patent Number: 5,934,969
[45] Date of Patent: Aug. 10, 1999

[54] METHOD AND APPARATUS FOR MODEL CONSTRUCTION

[75] Inventors: Steven F. Rehkemper; Jeffrey G. Rehkemper, both of Chicago, Ill.

[73] Assignee: Rehkemper ID, Inc., Chicago, Ill.

[21] Appl. No.: 08/946,203

[22] Filed: Oct. 7, 1997

[51] Int. Cl.$^6$ .............................. A63H 3/36; G09B 23/00
[52] U.S. Cl. ..................... 446/385; 446/368; 446/373; 434/276; 434/295
[58] Field of Search ...................................... 446/385, 267, 446/368, 373, 97, 153, 86; 434/262, 265, 267, 268, 270, 271, 272, 274, 365, 276, 295, 296

[56] References Cited

U.S. PATENT DOCUMENTS

| | | | |
|---|---|---|---|
| 3,722,108 | 3/1973 | Chase | 434/267 |
| 4,518,367 | 5/1985 | Zaruba et al. | 446/373 |
| 4,708,836 | 11/1987 | Gain et al. | 264/40.1 |
| 4,738,647 | 4/1988 | Renger et al. | 446/86 |
| 5,620,326 | 4/1997 | Younker | 434/268 |
| 5,722,836 | 3/1998 | Younker | 434/272 |

*Primary Examiner*—Kien T. Nguyen
*Assistant Examiner*—Michael Priddy
*Attorney, Agent, or Firm*—Schweitzer Cornman Gross & Bondell LLP

[57] ABSTRACT

A model kit for creating replicas of animals comprises a mold into which a casting material is placed to generate the chosen animal-like form. Components simulating internal organs of the creature are assembled and placed within the mold prior to casting, whereby they are embedded in the casting material. One or more of the components may simulate selected soft tissue organs or groups of organs, and may be of a bladder-like construction, allowing it to be filled with a liquid. The casting material sets to a thick gel-like consistency, allowing the material to be excised from about the internal organ components, whereby the user can "dissect" the creature.

12 Claims, 3 Drawing Sheets

METHOD AND APPARATUS FOR MODEL CONSTRUCTION

The present invention relates to a new and improved method and apparatus for a toy product and in particular to a new and improved method and apparatus for making three-dimensional, dissectable models of animals and imaginary creatures.

BACKGROUND OF THE INVENTION

The study and dissection of formerly living creatures is a well known and highly regarded part of scientific investigation. Similarly, on the hobby level, children have long been exposed to models of both real and fictional creatures. Heretofore kits have been provided which allow a child to construct, from a plurality of parts, accurate reproductions of vertebrates and invertebrates, both present and past, real and imaginary. There also exist model kits which permit investigation and assembly/disassembly of the internal systems of an animal. Typically, the "organs" are arranged in an empty cavity within a rigid "skin", the user being permitted to install and remove the organs. Often the organs are visible through a clear material in which they are mounted.

While the prior art has thus provided a plurality of realistic models for both play and study purposes, they often have limited continuous play value. In particular, an assembled model, once constructed, often loses its play appeal. Models having internal organs, while somewhat extending the play life by allowing the repetitive insertion and removal of the internal organs, can decrease in appeal due to the repetitive unvarying nature of the installation and removal process. Further, the organs are fully visible, and thus offer little in the way of challenge for successful removal.

Accordingly, it is a purpose of the present invention to provide a model kit and construction methodology which has increased play value and interest.

A further purpose of the present invention is to provide a model apparatus and methodology which allows the user to replicate or create the internal structure of a creature, either real or imaginary, and enclose them within additional simulated "viscera" within a "skin".

A further purpose of the present invention is to allow a user of such a model to "dissect" the assembled creature for location and study of internal "organs".

Still a further purpose of the present invention is to provide such a model in which realistic bodily fluids may be encountered during the dissection process.

Still a further purpose of the present invention is to provide such a model in which the internal organ elements may be reused, and a new "skin" recast, to extend the interest and play value of the model assembly.

BRIEF DESCRIPTION OF THE INVENTION

In accordance with the foregoing and other objects and purposes, a model kit produced in accordance with the present invention comprises a kit of components for creating a model replica of a particular creature, either real, such as a frog, or imaginary, such as a "space monster". The kit includes a plurality of structures replicating internal organs of the creature. These may include skeletal elements, as well as soft tissue organs or systems. One or more of the soft tissue organs may be in the form of a sac or bladder into which a liquid may be loaded to simulate blood or other bodily fluids. A mold representing the external surface or appearance of the creature is provided into which the internal organs are placed. The mold is then filled with a casting substance, which both takes the form of the mold and surrounds and encases the internal organs.

Upon curing, the model is removed. Paints and/or other pigments may be provided to allow the model's "skin" to be colored or otherwise decorated or further sculptured as desired.

The kit may further include a "dissection" tray, upon which the completed animal may be placed. A set of dissection tools are provided, allowing the child to "dissect" the animal, locating and identifying the internal organs as the encapsulating material is explored. Perforation of an internal organ, either accidental or intentional, will result in the exudation of the liquid placed therein, both providing an increased level of realism to the dissection as well as an additional level of interest. Upon full dissection, the internal organs may be reused in connection with the molding of a subsequent creature for dissection.

The method of the present invention comprises the assembly of the internal organs of the creature within a mold, the casting of a material about the internal organs to form a generally life-like or realistic sculpture of the creature, and removal of the model from the mold. The model is then dissected, exposing the internal organs. The fully exposed organs may then be reassembled for reuse in a subsequently-cast model.

BRIEF DESCRIPTION OF THE DRAWINGS

A fuller understanding of the present invention may be achieved upon review of the following detailed, but nonetheless illustrative embodiments of the present invention, when reviewed in connection with the annexed drawings, wherein.

DETAILED DESCRIPTION OF THE INVENTION

In accordance with the figures, the present invention may be in the form of a kit of components for the creation of a chosen creature model and its subsequent "dissection". The kit may include mold 10, which provides a three-dimensional outline corresponding to the outer appearance or "skin" of the creature to be constructed. As depicted, the creature is a frog. However, a variety of creatures, both real and imaginary, may be provided, including, at true or reduced scale, both vertebrates or invertebrates, such as insects, reptiles, birds and dinosaurs, as well as fictional creatures of a variety of appearances. Such imaginary forms may be chosen to replicate "known" creatures, such as characters of television or motion picture productions, such as "Godzilla" or the like, or may constitute truly fanciful and unique creatures. The mold is preferably of a two-part format, such as depicted in the Figure, allowing initial access to the interior of the mold for assembly of the internal organs therein, and may be formed of a transparent material, such as plastic, to allow observation of the internal organs arrayed therein and to monitor the casting process as the mold is filled. At least one-half of the mold is preferably of sufficient depth to allow the internal organs to be arrayed therein and to provide some degree of surrounding support therefor.

The internal structure of the creature to be replicated is developed by the assembly of a plurality of individual organ structures. As shown, they may include "bones"12 which themselves may be assembled from component parts and then connected together by the use of suitable connectors, such as complementary hooks and eyelets 14, 16, into a skeleton 18. The skeleton 18 may be either complete or partial. As depicted in the Figures, the skeleton 18 may include, for example, a partial rib cage area 20, having an interior space or volume in which one or more soft tissue organs may be located.

Figure 1:
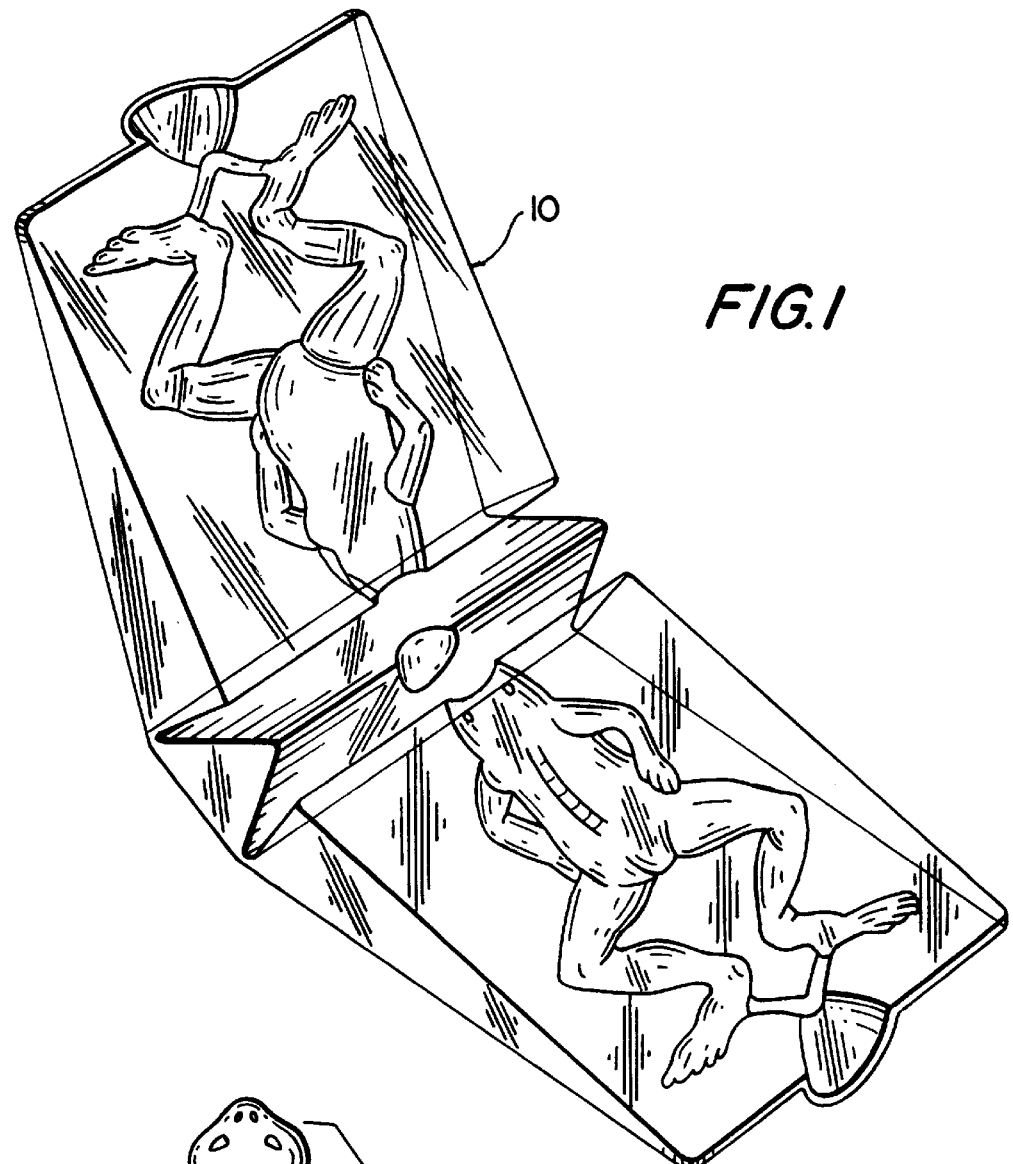
FIG. 1 is a representation of a mold utilized in connection with the present invention.
Figure 2:
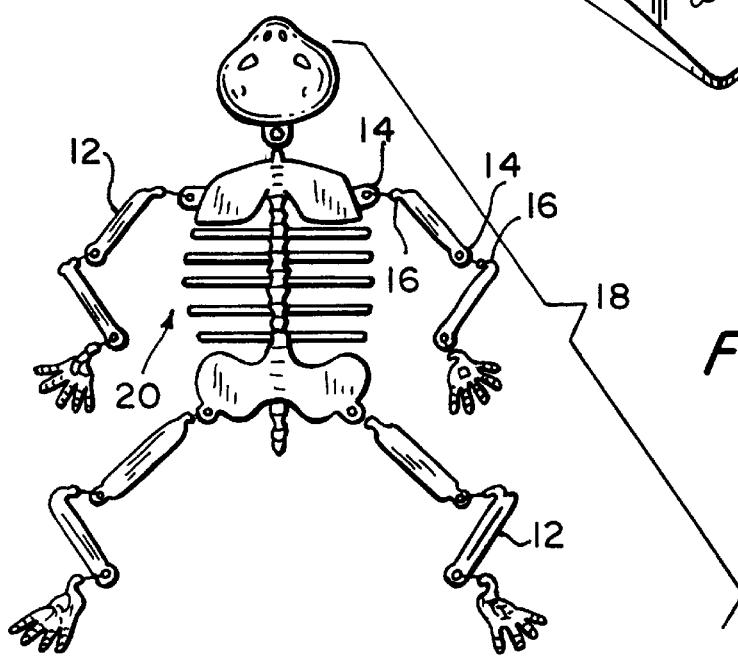
FIG. 2 is a representation of a portion of a "skeleton" which may be assembled as part of the internal organs of a creature.
Figure 3:
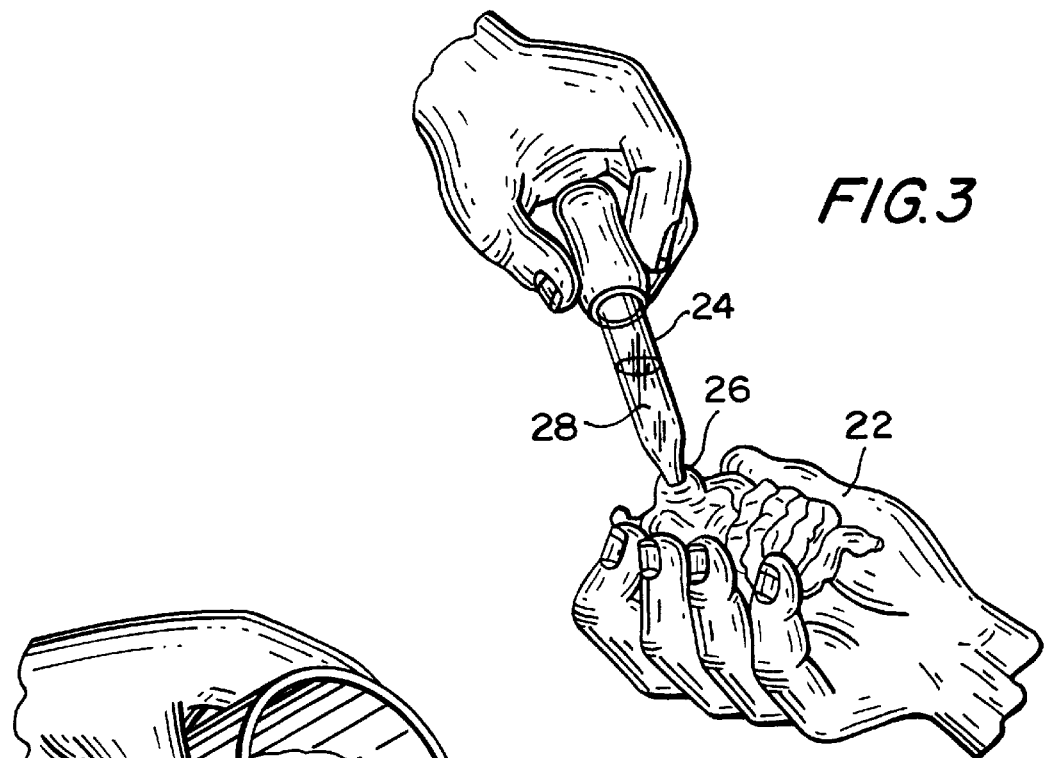
FIG. 3 is a representation of a soft tissue "organ" in association with an apparatus for filling the organ with an appropriate "bodily fluid"

As depicted in FIG. 3, one or more of such soft tissue organs may be supplied. As contemplated herein, such a soft tissue organ may be a representation of a single organ, such as a heart or lung, or a combination of organs, either associated as a partial or complete system, such as the digestive system, or unrelated but physically connected into a unitary element, such as, for example, the combination of a heart, lungs, and liver. The organs may also be imaginary in "function" and/or appearance. Typically, their construction is of a soft, plastic or rubber-like material, chosen as known in the art, to generally simulate the tactile qualities of an organ. In a preferred embodiment, and as depicted, one or more of the organs may be in the form of a flexible sac or bladder 22.

As part of the kit a syringe or dropper-like device 24 is provided, having a tapered injector portion 26 which may be inserted through the organ wall to load a liquid 28 therein. The bladder may be formed of a rubber-like substance, known in the art, which self-seals when the ejector is removed, maintaining the liquid inside. Alternatively, the bladder may be provided with a sealable fill port, or a valve mechanism to accommodate the ejector. The kit may further include a "recipe" and the necessary components to formulate the injected liquid. The components may include, for example, appropriate non-toxic dyes or colorants which, when mixed with water, produces a liquid having a desired appearance. Thickening agents and/or fragrances may also be included.

Figure 4:
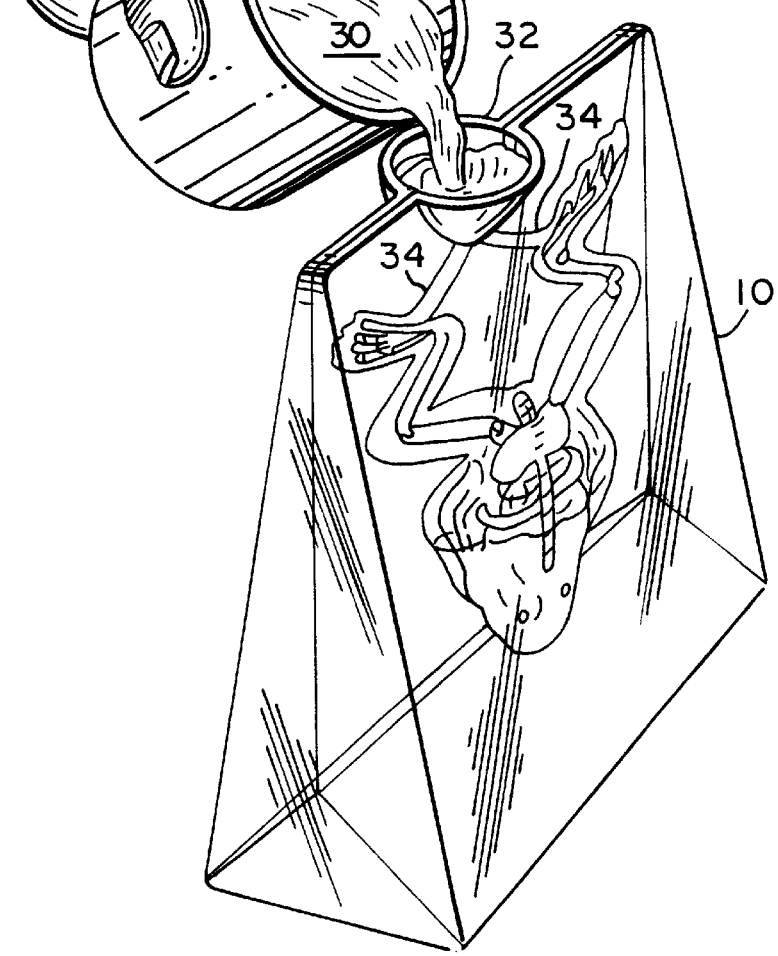
FIG. 4 is a depiction of the mold in the closed configuration, with internal organs arrayed therein, for accepting the casting material.

After assembly of the "skeleton" and preparation of the soft tissue organs as desired, they are arranged within the mold in a desired pattern. Typically, at least in the case of actual creatures, the arrangement can at least generally replicate the actual internal structure of the creature. An accompanying text may be provided to assist the child in placing the organs in the proper location and to provide background information concerning the creature, its anatomy, and other data. The mold is then closed and positioned to receive molding compound, as depicted in FIG. 4.

The kit further comprises an appropriate molding compound, either in conjunction with a hardening agent, or in a formulation which is to be combined with water and which commences a setting reaction. A preferred class of molding compounds are non-toxic alginates. As known in the art preferred alginates, as exemplified by the dental casting compound sold under the INSTAMOLD trademark by Activa Products, Inc., of Marshall, Tex., pass through an intermediate, gel-like phase during the curing process. It is the gel-like phase which is utilized by the present invention to allow the molded creature to have a "life-like" composition and which permits the "dissection" of the creature. The molding material 30, when prepared, is poured into the mold through an appropriate fill port 32 in the mold, which is coupled by a sprue 34 to the interior mold volume to be filled. The mold is filled with the casting material, the internal organs being surrounded and embedded thereby. With the mold filled, the material is permitted to set. The molding material is preferably opaque to prevent identification of the location of the organs through the compound.

With the molding compound properly cured, the mold is opened and the cast "creature" removed. The kit may include a variety of materials to color or otherwise treat the surface of the creature, and may include paints and brushes, as well as sculpture tools, to allow mold marks to be removed from the creature and to otherwise modify the surface texture and configuration as may be desired.

Figure 5:
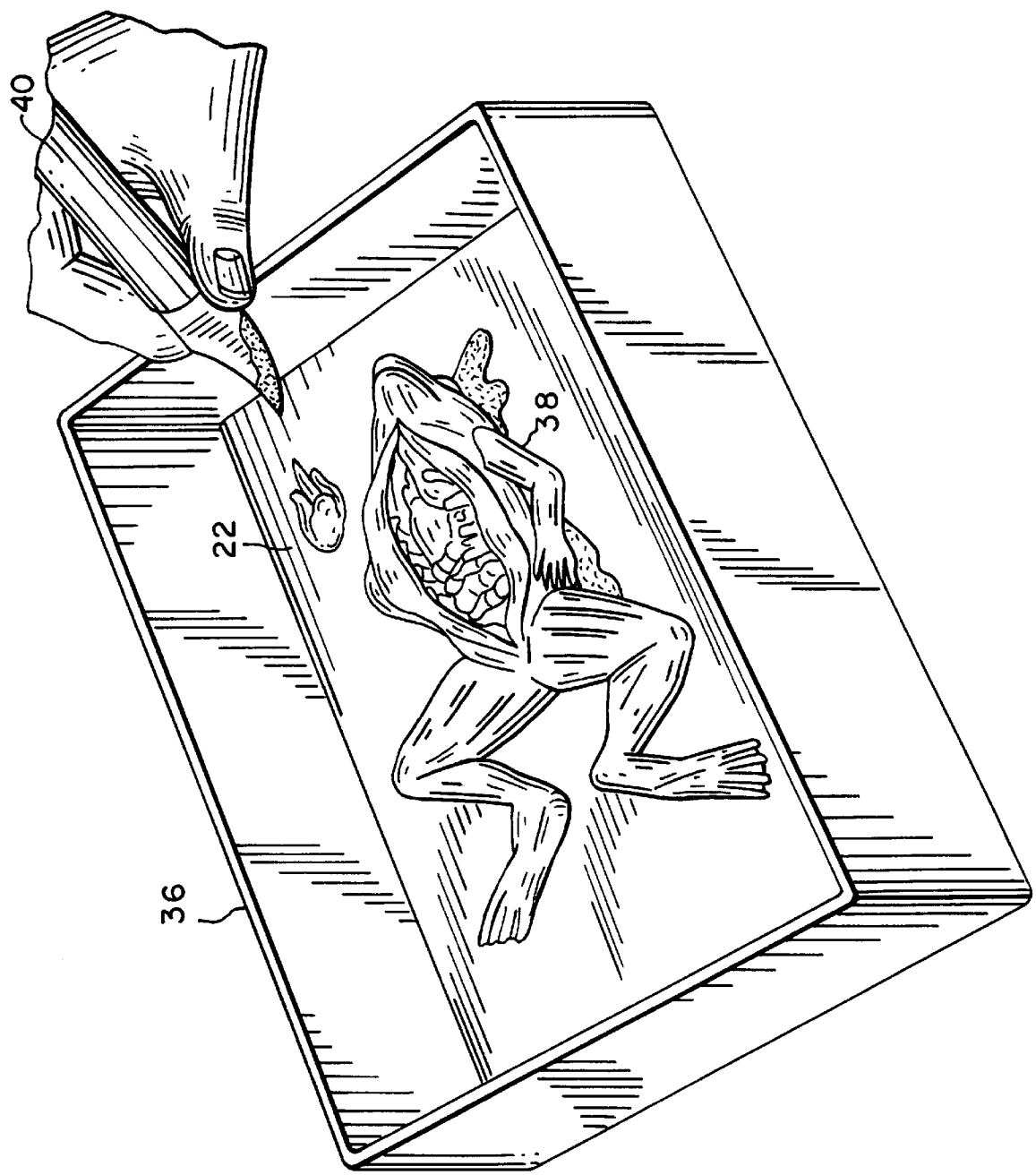
FIG. 5 is a representation of the completed "creature" removed from the mold and placed on a dissection tray for dissection.

The kit also encompasses the inclusion of a "dissection" tray 36, as depicted in FIG. 5, upon which the creature 38 may be placed. With the use of suitable instruments, including scalpel 40, tweezers, and probe-like instruments for cutting removing the molding material, the user dissects the creature, excising the overlying set casting compound to expose the internal organs. Because one or more of the internal organs may be of the bladder-type, the user must exert care during the dissection, lest he or she puncture an organ, releasing the enclosed bodily fluid.

The dissection process may be continued until the entirety of the internal organs are exposed and released from the surrounding matrix. The internal organs, such as the soft tissue organ 22, may be removed from the creature for further study, the skeleton, for example, being further disassembled into its constituent bones. Preferably, the internal organs are each constructed of a material to which the molding material does not permanently and rigidly bond, thus facilitating the removal of the casting material from the organs, both to facilitate dissection and to allow possible reuse.

As set forth herein, the model kit of the present invention provides an increased level of realism and interest over conventional biology-oriented model kits, while allowing for extended play and re-use of components. Those skilled in the art will recognize that modification and adaptions to the invention are possible without departing from the intended scope of the invention.

What is claimed is:

1. A model kit, comprising
    a fillable mold having a mold cavity representing the external appearances of a chosen creature;
    a plurality of elements each corresponding to an internal organ of the chosen creature, said elements being assembleable within said mold cavity, and
    a casting compound for filling said mold cavity to generate a solid model having the external appearance of the creature, said casting compound being curable to solidify from a liquid state when in said mold;
    whereby said casting compound, when cast within said mold, is removable from said mold with the internal organ-forming element being embedded therein to provide a dissectable model of the chosen creature.

2. The model kit of claim 1 further comprising a set of tools for selectively removing said casting compound when cast to reveal and expose said internal organ-forming elements.

3. The model kit of claim 1, wherein said casting compound is an alginate.

4. The model kit of claim 1, wherein said chosen creature is a frog.

5. The model kit of claim 1, wherein said elements include elements corresponding to bones and soft tissue organs of said chosen creature.

6. The model kit of claim 5, wherein said elements corresponding to soft tissue organs include at least one element in the form of a liquid-fillable container.

7. The model kit of claim 6 further comprising a tool for filling said liquid-fillable container with a liquid.

8. The model kit of claim 7, wherein said liquid-fillable container comprises a self-sealing container wall.

9. A method of play for a model toy of a creature, comprising the steps of assembling a plurality of elements representing internal organs of the creature in a mold having a mold cavity corresponding to the external appearance of the creature;

forming a cast of the creature through the loading of a frangible casting compound into the mold, thereby encasing and embedding the elements within the molding compound; and allowing the molding compound to cure and removing the cast from the mold.

10. The method of claim 9 further comprising the step of selectively removing cured casing compound from the elements to expose the elements by use of tools simulating dissection equipment.

11. The method of claim 10, wherein the step of assembling a plurality of elements includes the loading of a liquid into at least one of said elements which is in the form of a bladder.

12. The method of claim 10, wherein the step of assembling a plurality of elements include the sub-assembly of a plurality of said elements representing bones of the creature into a partial skeleton.

* * * * *